United States Patent
Lassota

(10) Patent No.: US 7,980,422 B2
(45) Date of Patent: *Jul. 19, 2011

(54) PORTABLE BEVERAGE DISPENSER WITH ELECTRONIC BEVERAGE CHARACTERISTIC DISPLAY AND METHOD

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 1583 days.
This patent is subject to a terminal disclaimer.

(21) Appl. No.: 10/819,828

(22) Filed: Apr. 7, 2004

(65) Prior Publication Data
US 2004/0195263 A1    Oct. 7, 2004

Related U.S. Application Data

(62) Division of application No. 09/931,687, filed on Aug. 16, 2001, now Pat. No. 6,741,180.

(60) Provisional application No. 60/278,839, filed on Mar. 26, 2001.

(51) Int. Cl.
  B67D 7/06    (2010.01)
  A23B 7/154   (2006.01)

(52) U.S. Cl. ......... 222/23; 222/146.2; 340/622; 99/280; 426/321

(58) Field of Classification Search ............ 222/23, 222/146.2, 609; 340/618–624; 99/280, 290, 99/285, 281, 305; 426/321; 73/301
See application file for complete search history.

(56) References Cited

U.S. PATENT DOCUMENTS

| | | | |
|---|---|---|---|
| 4,056,050 A * | 11/1977 | Brown | 99/305 |
| 4,833,978 A | 5/1989 | Martone et al. | 99/280 |
| 4,993,593 A | 2/1991 | Fabiano et al. | 222/1 |
| 5,072,660 A | 12/1991 | Helbling | 99/280 |
| 5,158,793 A | 10/1992 | Helbling | 426/231 |
| 5,183,998 A | 2/1993 | Hoffman et al. | 219/492 |
| 5,229,751 A * | 7/1993 | Chandler et al. | 340/618 |
| 5,285,718 A | 2/1994 | Webster et al. | 99/290 |
| 5,309,821 A | 5/1994 | Knepler | 99/282 |
| 5,375,508 A | 12/1994 | Knepler et al. | 99/280 |

(Continued)

FOREIGN PATENT DOCUMENTS

DE    4418546 A1 *  2/1996

*Primary Examiner* — Kevin P Shaver
*Assistant Examiner* — Melvin A Cartagena
(74) *Attorney, Agent, or Firm* — James W. Potthast; Potthast & Associates

(57) ABSTRACT

A dispensing urn assembly (10, 10') with a hollow body (12) with an interior surface for containing beverage (14) and a manually operable faucet (16) for selectively dispensing beverage (14) from the bottom of hollow body with an electronic status display assembly (50) controlled by a microcomputer (62) in response to a temperature probe (44), a level probe (42) and a timer reset switch (46) to provide graphic displays (64,68, 72), numerical displays (66,70, 74) of the temperature, quantity and time elapsed or remaining since the brewing of the beverage and light indication displays (55,57, 59) when preselected values are achieved. A an integrated funnel assembly (30') with a down-tube (40) and level probes (174-186) carried by the down-tube (40), electronic module (170) and relatively rigid interconnection (200,174) between provides a water tight passageway for leads from the probes to the microcomputer (62) contained within the electronic component housing and forms a single subassembly or module that eliminates the need for switches for activation and operation of the display (162) and may be removed for cleaning or repair.

84 Claims, 9 Drawing Sheets

U.S. PATENT DOCUMENTS

| | | | |
|---|---|---|---|
| 5,560,284 A | 10/1996 | Weidman et al. | 99/281 |
| 5,671,325 A | 9/1997 | Roberson | |
| 5,862,738 A * | 1/1999 | Warne | 99/281 |
| 5,901,634 A | 5/1999 | Vancamp et al. | 99/281 |
| 5,956,151 A | 9/1999 | Zajac et al. | 356/436 |
| 6,062,126 A * | 5/2000 | Johnson et al. | 99/285 |
| 6,095,031 A | 8/2000 | Warne | 99/282 |
| 6,155,158 A | 12/2000 | Anson | 99/280 |
| 6,237,811 B1 | 5/2001 | Ford | 222/129.1 |
| 6,298,721 B1 * | 10/2001 | Schuppe et al. | 73/299 |
| 6,419,120 B1 | 7/2002 | Bertone | 222/129.4 |
| 6,460,735 B1 | 10/2002 | Greenwald et al. | 222/146.1 |
| 7,000,468 B2 * | 2/2006 | Doorhy et al. | 73/301 |

\* cited by examiner

PORTABLE BEVERAGE DISPENSER WITH ELECTRONIC BEVERAGE CHARACTERISTIC DISPLAY AND METHOD

CROSS-REFERENCE TO RELATED APPLICATION

This application is a divisional of and claims the benefit under 35USC120 of U.S. application Ser. No. 09/931,687 filed Aug. 16, 2001 now U.S. Pat. No. 6,741,180 which, in turn, claims under 35 U.S.C.119(e) the benefit of U.S. Provisional application No. 60/278,839 filed Mar. 26, 2001 and entitled "Beverage Dispensing Urn with Electronic Display", and assigned to the assignee of the present application.

BACKGROUND OF THE INVENTION

1. Field of the Invention

This invention relates generally to portable beverage dispensing urns, or portable beverage dispensers, of the type having apparatus such as a faucet for dispensing the beverage and a top with an inlet for direct receipt of freshly brewed beverage from a coffee brewer or the like.

2. Discussion of the Prior Art

Portable beverage dispensers, or beverage dispensing urns, of the type having a top with an inlet for direct receipt of brewed beverage into a hollow, insulated urn body and a manually operable faucet at the bottom or other dispensing means for selectively dispensing beverage from the urn into a carafe or serving cups are well known. Some of the known portable beverage dispensers include a level indicating sight in the form of a glass, plastic or other transparent tube in fluid communication with the beverage in the container such that the level of the beverage within the sight corresponds to the level of the beverage within the hollow body of the urn. The sight and the level of the beverage in the sight is visible from outside of the dispensing urn to enable a user to determine the quantity of beverage contained within the urn without opening the top.

A serious problem with the tubular sights is that after use they become stained or coated with beverage residue. However, even though they must be regularly cleaned for purposes of sanitation and so that the residue does not contaminate and adversely affect the taste and quality of the beverage. Unfortunately, in know portable beverage dispensers the relatively small diameters and elongate body of the sight tubes renders it very difficult if not impossible to clean the sight tubes and their connections to the urn thoroughly without disassembly. Consequently, excessive time and labor is spent maintaining the urns in a sanitary condition or they are used in an unclean condition with resultant bad effects on the taste or quality of the beverage.

Because of this sanitation problem, such urns are not qualified for use with milk products that require higher standards of cleanliness than coffee dispensers because of the different nature of the beverages and the different potentials of harm resulting from lack of thorough cleaning. It is believed that there are no beverage dispensers with transparent tubular, level sights, or gauges, approved by the FDA, for use in dispensing milk and other milk products because of the inability to easily clean such level gauges.

In the case of a hot beverage, such as coffee, the temperature of the beverage decreases over time. In addition, the beverage also deteriorates over time due to contact with the air within the urn from the time it is first brewed directly into the dispensing urn and due to radiant heat loss through the sides of the hollow body of the beverage dispenser and also due to the heat loss caused by dispensing the beverage. In the case of cold drinks, such as ice tea or milk, the temperature gradually rises over time.

Generally, with the exceptions noted below, portable beverage dispensers lack any means for providing an indication of either beverage level, beverage temperature or elapsed time.

In U.S. Pat. No. 4,993,593 issued Feb. 19, 1991 to Fabiano et al. a hot soup dispenser is shown that has a temperature sensor, such as a thermistor, located adjacent the bottom of the hollow body at a low level mark. The temperature sensor is part of a temperature control system that includes an A.C. powered heating element to maintain the temperature between two selected maximum and minimum limits. When the beverage level falls beneath the low level mark, a change in temperature is detected to provide a single "LOW LIMIT" indication to advise an operator to add more soup. Unfortunately, this system is only guaranteed to work because the soup is being electrically heated to a temperature that is greater than the air within the hollow body of the soup dispenser. In an insulated beverage dispenser that lacks any means to heat the beverage, the hottest, or coldest, temperature exists when the beverage is first added to the dispenser and then gradually cools, or warms, to the ambient air temperature surrounding the dispenser. The air within the hollow body of the dispenser also degrades to the ambient air temperature, and when the temperature of the air within the hollow body equals the temperature of the beverage, there is no temperature differential sensed when the beverage falls beneath the low level mark. Also, the level sensor will not properly function with a beverage that is neither pre-heated nor pre-cooled. Moreover, since only the LOW LIMIT is indicated, there is not pre-warning of the beverage being depleted and no tracking of the gradual depletion of the beverage. In addition, of course, the soup dispenser is not portable because it requires a connection to an A.C. power outlet to maintain the hot temperature of the soup and thereby enable successful operation of the LOW LIMIT sensor and indicator. Because successful operation of the LOW LIMIT indicator relies upon connection of the soup dispenser to an AC power outlet, it fails to offer any solutions for a portable beverage dispenser that relies only on passive methods to maintain the temperature of the beverage.

In U.S. Pat. No. 4,290,537 issued Sep. 22, 1981 to Chi-Jung an air pot dispenser is shown with an insulated, non-electrically heated hollow body that is provided with a level indicator and a temperature indicator. Disadvantageously, the level indicator employs a mechanical float that must float in the beverage and is slidably attached to the discharge tube and thus cannot be fixedly connected to the level indicator that is mounted within the removable cap. The float remains in the hollow body of the airpot dispenser when the cap is removed to enable filling the airpot with beverage. The float and the linkage to the level indicator are apparently not readable removable for necessary cleaning of the interior of the airpot dispenser. Also disadvantageously, the temperature sensor does not measure the actual temperature of the beverage but instead only measures the temperature of the air, being "heated by the steam" within the hollow body located above the beverage and does not measure the temperature of the beverage, itself. Moreover, both of the indicators of level and temperature are mounted to an upwardly facing surface of a top closure cap and thus cannot be viewed by a user except when the viewer is located directly above the cap.

Beverage makers, such as coffee makers, that have hot water tanks with A.C. powered heating elements to maintain the temperature of the mixing water that is added to the ground coffee beans, of course, have temperature sensors that form part of the hot water temperature control system and the actual temperatures may be temporarily monitored for purposes of setting the limits and to determine whether the temperature control system is properly functioning or whether the limits have been correctly selected. An example of such a brewer is shown in U.S. Pat. No. 5,357,508 issued to Knepler et al. on Dec. 27, 1994. However, the hot water is only an ingredient that is added to another ingredient to make a beverage and not the beverage, itself, the brewer is not portable, but is bound to an A.C. power outlet.

In U.S. Pat. No. 5,229,751 issued Jul. 20, 1993 of Chandler et al an automatically actuated elapsed time timer is used to control display to indicate whether the beverage is "FRESH", but this does not provide any actual condition of the beverage and this feature is only utilized with an insulated, transparent glass beaker with an open top from which the beverage is poured, and thus has no use for a level.

SUMMARY OF THE INVENTION

It is therefore an object of the present invention to provide a dispensing urn that overcomes one or more of the foregoing disadvantages of the known dispensing urns noted above.

This objective is achieved in part by providing a portable beverage dispenser having an opaque, insulated, non-electrically heated, hollow body with a closed bottom, atop with an inlet for receipt of a beverage for containing a multiple servings of the beverage and means for selectively dispensing servings of the consumable liquid from within the body, with an electronic level display assembly having an electronic liquid level sensor assembly mounted to the hollow body and in sensing relationship with the consumable liquid within the hollow body to sense a plurality of different liquid levels, an electronic display mounted to the hollow body and facing laterally outwardly from the hollow body for ease of viewing from a lateral position spaced from the side hollow body, a controller responsive to the electronic liquid level sensor for controlling the electronic display to show an indication of the plurality of different liquid levels in response to the electronic liquid level sensor assembly, and a portable power supply carried by the hollow body for providing a source of operating energy for both the electronic liquid level sensor assembly and the electronic display, said portable power source being the only source of electrical power of the portable dispensing urn assembly.

Preferably, the sensor mounting member is elongate and is mounted to extend from adjacent the top to adjacent the bottom within the hollow body and the electronic level sensor assembly includes a plurality of level sensors arranged along the sensor mounting member at a plurality of different distances from the bottom corresponding to the plurality of different liquid levels, respectively. Also, in the preferred embodiment, a single integrated mounting assembly for protectively housing all the electronic liquid level sensor assembly, the electronic display, the micro-computer and the portable power supply is provided as well as means for releasably attaching the mounting assembly to the hollow body.

Additionally, an electronic temperature sensor separate and apart from the electronic liquid level sensor for sensing actual declining temperature of the beverage, itself, within the hollow body, is provided in the portable beverage dispenser, and the controller is responsive to the to the electronic temperature sensor to control the electronic display to show the actual temperature of the beverage. In such case, the display means includes means to display both the actual decreasing temperature of the beverage and the actual different quantities of beverage contained within the opaque, unheated hollow body.

Additionally, the portable beverage dispenser may include a timer carried by the hollow body, and means carried at least in part by the hollow body for restarting the timer each time beverage is added to the hollow body. Preferably, the restarting means includes means for restarting the timer by one of (a) manual actuation of a restart switch or (b) means for automatically restarting the timer in response to direct sensing of the addition of beverage to the hollow body.

The object of the invention is also achieved by providing for use in a portable beverage dispenser having an insulated, unheated, opaque, hollow body with an interior surface for containing beverage and extending between a top with an inlet for receiving beverage and a bottom, and a manually operable beverage dispenser attached to an exterior surface of the body for selectively dispensing beverage from the hollow body, a method of indicating a condition of the beverage contained within the unheated, opaque hollow body by performance of the steps of electronically directly sensing an actual condition of the beverage within the hollow body to be displayed with electronic sensing means attached to and carried by the hollow body, and displaying with a display means attached to and carried by the hollow body an indication of the actual beverage condition of the beverage contained within the hollow body in response to the electronic actual condition directly sensing means.

Additionally, the objective of the invention is achieved by providing a method for use in a portable beverage dispenser having a hollow body with an interior surface for containing beverage and extending between a top and a bottom, and a dispensing means attached to an exterior surface of the body adjacent the bottom for selectively dispensing beverage from the hollow body, for electronically indicating an actual condition of the beverage by performing the steps of releasably mounting to the top of the hollow body a beverage funnel assembly with a funnel body for passage of fresh beverage between a funnel inlet and a funnel outlet, and a hollow down-tube extending downwardly into the hollow body of the dispensing urn assembly from the funnel outlet, carrying into the hollow body with the down-tube an electronic beverage condition sensor mounted to the down-tube when the beverage funnel assembly is releasably attached to the top of the hollow body, passing fresh beverage through the funnel assembly and the down-tube into the hollow body, sensing with the electronic beverage condition sensor an actual condition of the beverage contained within the hollow body, protecting a display controller within a water tight component housing of the funnel assembly, passing electrical signals through an electrical lead extending from the electronic beverage condition sensor to the controller via a relatively rigid, hollow, water tight passageway extending along the down-tube and through the funnel body between the sensor and the electronic component housing, and controlling a display mounted to the funnel assembly of the funnel assembly with a controller contained within the water tight electronic component housing of the funnel assembly in response to electrical signals from the electronic beverage sensor to display the actual beverage condition.

The objective is also achieved by providing a portable, insulated, dispensing urn assembly for temporarily storing and dispensing pre-prepared hot beverage with an insulated, non-electrically heated, opaque, hollow body for holding the pre-prepared beverage with an interior for containing hot beverage, a top insulated cover with a releasably attached funnel assembly with an inlet for receiving beverage directly from a beverage brewer and an outlet for passing the received beverage to the interior, and an insulated bottom, a manually operable dispenser attached to an exterior surface of the body, an electronic beverage condition sensor carried by the hollow body for electronically, directly sensing the a plurality of different quantities of a beverage within the interior, an electronic display carried by the hollow body that is connected to the sensor means attached to the hollow body for displaying an indication of the different quantities of the actual beverage condition in response to the electronic, actual beverage condition directly sensing means, and a portable power supply carried by the hollow body for providing a source of electrical energy for both the electronic sensor and the electronic display, said portable power source being the only source of electrical power of the portable dispensing urn assembly.

Also, the objective is obtained by providing a method for use in a portable beverage dispenser having an opaque, insulated, non-electrically heated, hollow body with a closed bottom, atop with an inlet for receipt of a beverage for containing a multiple servings of the beverage and means for selectively dispensing servings of the consumable liquid from within the body, a method of displaying the amount of beverage within the hollow body, by performance of the steps of mounting an electronic liquid level sensor assembly to the hollow body and in sensing relationship with the consumable liquid within the hollow body to sense a plurality of different liquid levels, showing an indication of a plurality of different quantities of liquid in response to the liquid level sensor assembly with a electronic display mounted to the hollow body and facing laterally outwardly from the hollow body for ease of viewing from a lateral position spaced from the side, and powering with a portable power supply carried by the hollow body a source of operating energy for both the electronic liquid level sensor assembly and the electronic display, said portable power source being the only source of electrical power of the portable dispensing urn assembly.

Additionally, the objective of the invention is achieved by providing a portable beverage dispenser having an hollow insulated body with a self-contained beverage display assembly having an electronic display, an electronic level sensor for sensing a plurality of different beverage levels, and an electronic controller responsive to the electronic level sensor to control the electronic display to provide an indication of on of a plurality of beverage levels, and a housing mounted to the hollow insulated body and protectively enclosing the level sensor and the electronic controller and supporting the display.

Further, the objective is achieved by providing a method for practice with a portable beverage dispenser having an insulated hollow body having the steps of releasably mounting to an opening in the top of the hollow body, a self-contained electronic beverage display assembly with means for displaying a characteristic of beverage within the hollow body, passing fresh beverage through the opening and into the hollow body via a passageway in the beverage display assembly, displaying the beverage characteristic while dispensing the beverage, and removing the self-contained electronic beverage display assembly from the opening to enable (1) access to locations within the hollow body for cleaning, (2) repair of the electronic level sensor assembly, or (3) replacement of a malfunctioning electronic level sensor with another functioning electronic level sensor.

BRIEF DESCRIPTION OF THE DRAWINGS

The foregoing advantageous features will be described in greater detail and other advantageous features will be made apparent form the following detailed description which is given with reference to the several figures of the drawing, in which.

DETAILED DESCRIPTION

Figure 1:
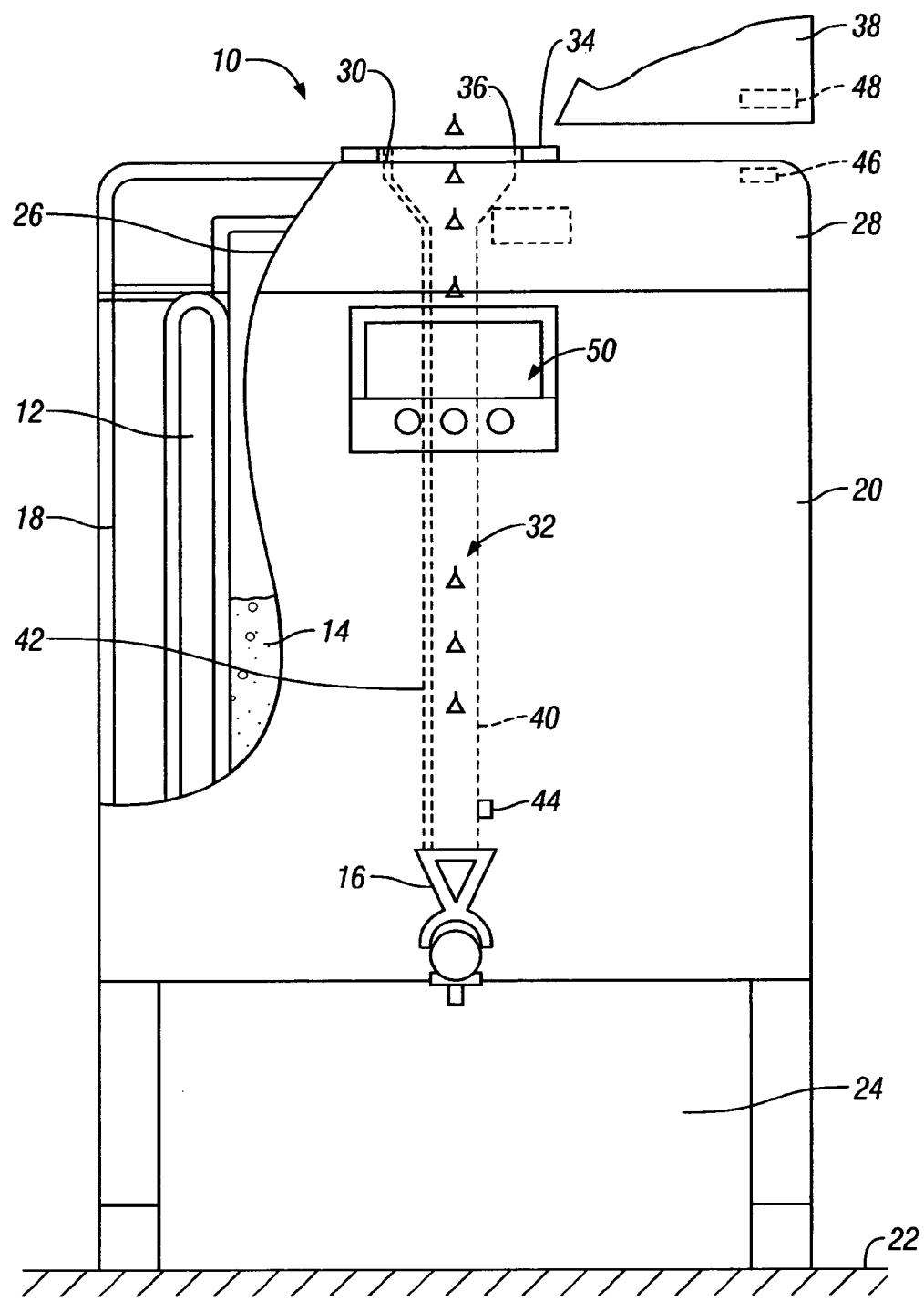
FIG. 1 is a schematic front elevation view of one embodiment of the beverage dispensing urn, or beverage dispenser, of the present invention and also illustrating a portion of a beverage brewer which cooperates with the dispenser to brew the beverage directly into the dispensing urn.

Referring now FIG. 1, a general schematic illustration of one embodiment of the dispensing urn 10 of the present invention is seen to include an insulating, cylindrical, double-walled evacuated liner 12 within which the beverage 14 is received and stored before being dispensed through a faucet 16. The liner 12 is contained within an outer housing 18 having a cylindrical body 20 with a bottom 21 that is supported above a support surface 22 of a serving cart or table or the like by a U-shaped base 24. The liner 12 has an opening 26 at the top of the body 20 substantially closed by a permanently attached, insulating cover 28. The cover 28 has a central inlet opening 30 for mounting receipt of a funnel assembly 32. The funnel assembly 32 includes a collar 34 with a funnel 36 having a tunnel-shaped inlet at the top of the funnel 36 for direct receipt of freshly brewed beverage from a coffee maker 38 or the like. The beverage 14 is passed through the funnel-shaped inlet to an upper input end of an elongate fill tube 40 that passes the hot beverage to the bottom of the liner 12.

In keeping with an important aspect of the invention the funnel assembly 32 carries along the length of the feed tube 40 a level-sensing probe 42 and carries at its distal, or free end an electronic temperature probe 44. The top cover 24 also may carry an encased proximity switch 46 actuated by movement away from a magnet 48 carried at the underside of a coffee brewer to start a timer circuit that will be described in detail below, or by any other suitable switch actuator actuated when the dispensing urn is moved away from a brewer after a brew cycle to reset and start a timer for measuring the time since the beverage in the liner 14 was freshly brewed. A display and control panel assembly 50 is mounted to the front of the body 20 to provide an indication of the quantity of beverage in the urn 10 as well as the temperature of the beverage 14 and the time since the beverage 14 was freshly brewed. A controller 52 is mounted in a protective compartment in the top cover 28, as shown in FIG. 3, and controls the display assembly 50 in accordance with inputs from the level sensor 42, the temperature probe 44 and the timer actuation of the timer switch 46.

Figure 2:
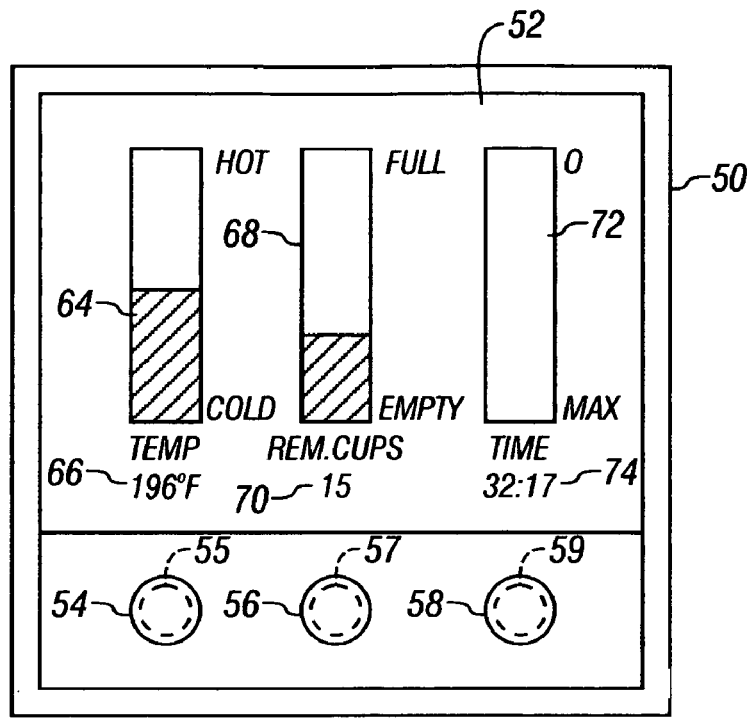
FIG. 2 is an enlarged view of a portion of the dispensing urn of FIG. 1 to better illustrate the display of the embodiment of FIG. 1.

Referring now to FIG. 2, the display and control panel assembly 50 previously shown in the embodiment in FIG. 1, includes a display screen 52, such as a liquid crystal display, that is capable of displaying both alphanumeric as well as graphic representations, and a plurality of back-lighted micro or membrane switches 54, 56 and 58 mounted beneath a closed, flexible switch panel 60. The switches are backlit by back lights 55, 57 and 59. The switches are used to program a computer controller 62, shown in FIG. 3, with the desired parameters or settings relating to quantity, temperature and time. The computer controller 62 preferably provides several indications of the status or condition of the beverage 14.

The temperature is graphically illustrated on a bar graph display 64 which linearly displays the temperature relative to a preselected "hot" temperature parameter and a preselected "cold" temperature parameter that are entered for storage into the computer controller 62 by the operator during a user programming mode. The temperature is also indicated in a numerical display 66, and when the temperature reaches a preselected minimum temperature a light behind the programming switch 54 is actuated to provide a lighted indication that the minimum temperature has been reached. Likewise, the quantity of beverage 14 remaining in the urn 10 is linearly indicated on a bar graph display 68 between a preselected maximum beverage quantity that can be stored by the urn 10 and preselected minimum, such a zero. The quantity of beverage 14 remaining is also indicated numerically at a numerical display 70 such as by the number of cups or servings remaining. When the preselected minimum quantity is reached, then the minimum level indictor light 57 located behind the programming switch 56 is lit to provide a lighted indication of this fact that can be seen from a distance. Likewise, the elapsed time or the time remaining before a preselected maximum time is reached is indicated linearly on a bar graph display 72 between a preselected time limit and zero time. The time is also indicated numerically on a time numerical display 74. When the elapsed time exceeds a preselected maximum time then the indicator light 59 behind the programming switch 58 is lit to provide a lighted indication of the lapse of the maximum time.

Figure 3:
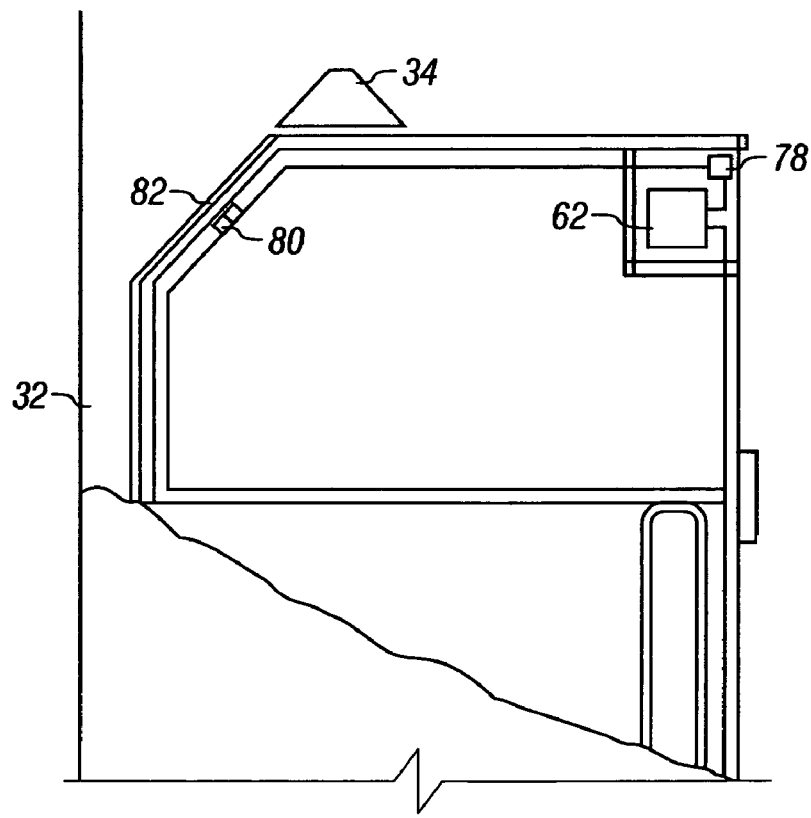
FIG. 3 is a rear view of a portion of the dispensing urn of FIG. 1 to illustrate the location of the battery power supply and microcomputer or other circuit used to interface with the sensors and to control the display.
Figure 4:
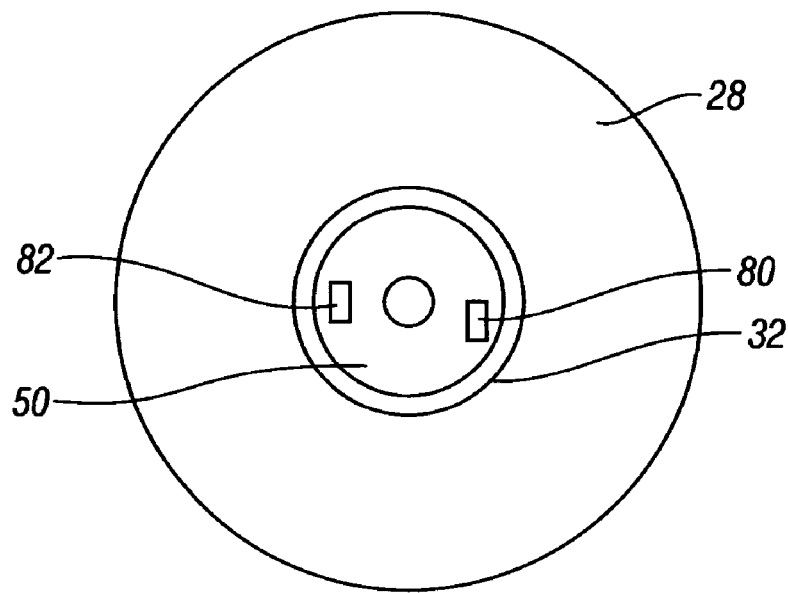
FIG. 4 is a top view of the dispensing urn of FIG. 5.

Referring now to FIG. 3, the computer controller 62 is contained within a protective compartment 76 within the top cover 28 together with a battery power supply, or battery, preferably a long life battery, 78. The battery 78 is connected to the computer controller 62 and the associated display panel 50 and the other associated circuitry through a power switch 80 only when the switch 80 is closed. The power switch 80 is closed to connect the battery 78 to the computer 62 when the funnel assembly 32 is positioned in the inlet opening 30 with an actuator 82 carried by the funnel portion located opposite the power switch 80, as shown in FIG. 3. In accordance with one aspect of the invention, the funnel assembly 50 is put in a different angular position shown in FIG. 4 in which the actuator 82 is spaced from the switch 80 and the switch 80 is not actuated into a power connecting state. In accordance with a method of the invention, the when the dispensing urn 10 is being stored in inventory and during shipping, the funnel assembly 50 is put in the non-actuating position shown in FIG. 4. After the dispenser has arrived on site, then the user is instructed to remount the funnel assembly 32 in the proper actuating position shown in FIG. 3 to connect the battery 78 to the computer controller 62 and the remaining circuitry to thereby enable operation of the display assembly 50. The actuator 82 may be a permanent magnet and the power switch 80 a magnetic reed switch actuated by the presence of the magnet actuator 82. Alternatively, a simple manual actuation switch is used or the user is instructed to install the battery 78 into a battery connection compartment to enable the application of battery power to the computer controller and the other associated circuitry.

Figure 5:
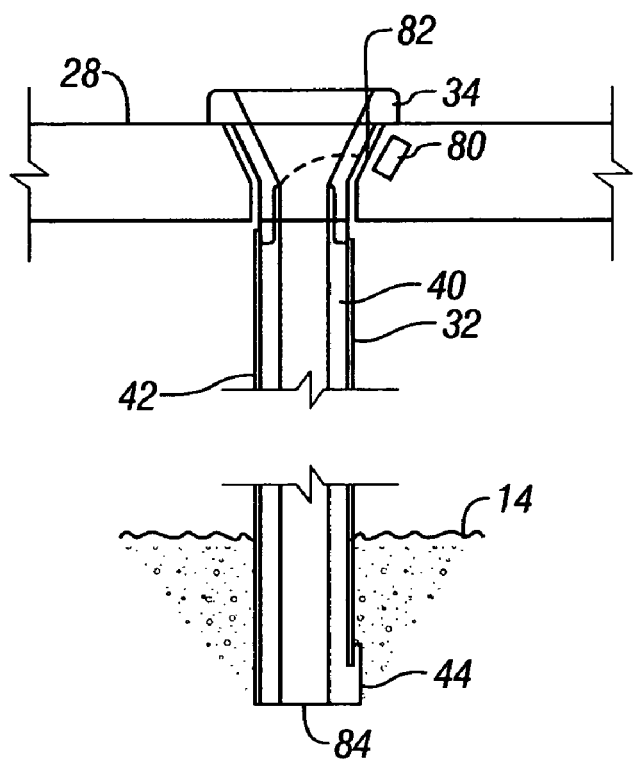
FIG. 5 is an enlarged sectional side view of the funnel inlet assembly shown in broken line in FIG. 1 and shown partly in FIG. 3.

Referring to FIG. 5, the level sensor is preferably an elongate resistive member that is part of a suitable bridge circuit that produces a varying output that varies with the part of the total length of elongate resistive member that is immersed in the liquid beverage 14. This value is then converted to a level that, in turn, in the cylindrical liner 12, is directly and linearly related to quantity. This level indicating signal is converted in the computer controller 62 to a volume quantity, such as the number of cups or servings remaining, for purpose of displaying a numerical quantity, but in the graphic display the level in the display corresponds to the level of the beverage without reference to the actual quantity which may vary with the maximum capacity of the liner 12. In any event, the level is measured electronically and converted to an indication of the level or quantity of beverage remaining or which has been removed.

Similarly, the temperature probe is mounted to or carried by the elongate tube 40 adjacent a bottom end 84 to measure the temperature adjacent the location of the faucet at which the coffee or other hot beverage will be removed. This temperature probe may be a sensor element that has a resistance or other electrical characteristic that varies with the temperature and can thereby be correlated to the temperature.

Figure 6:
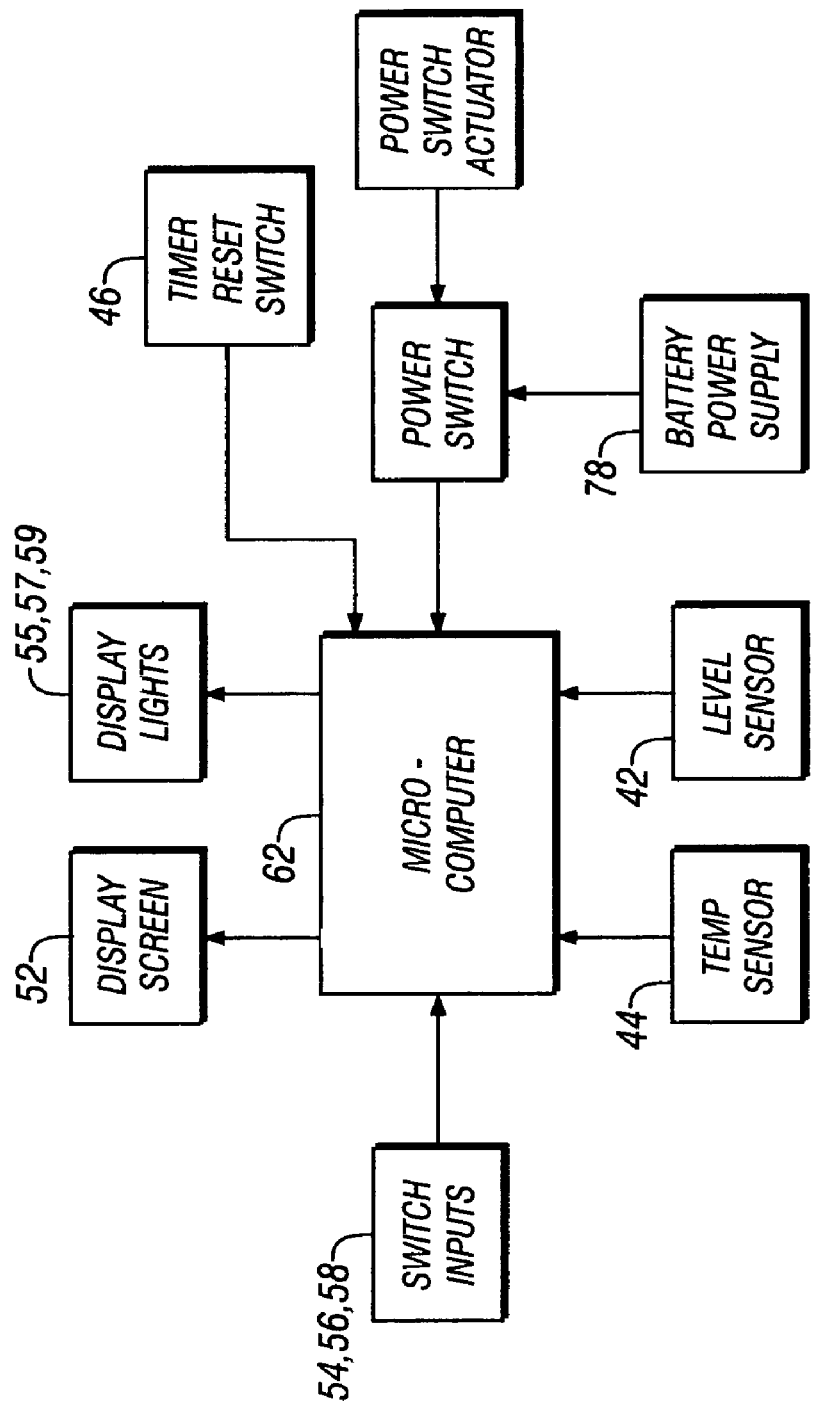
FIG. 6 is a functional block diagram of the display system.

Referring to FIG. 6, the measurement and display system of the present invention is seen to include a microcomputer 90, which receives inputs from the temperature sensor, or probe, 44 and the level sensing probe, or level sensor, 42, the timer reset switch 46 also seen in FIG. 1, and inputs from the switches 54, 56 and 58. The input switches are used to enter into and navigate thought the program mode or subroutine in which such parameters as the temperature range and the maximum elapsed time may be entered and stored by the user. The details of how these parameters are entered in the program mode are not inventive and there are many programming techniques available to enable easy entry of this information with three switch inputs used for entry of selections and navigating up and down in the menu choices being offered.

Figure 7:
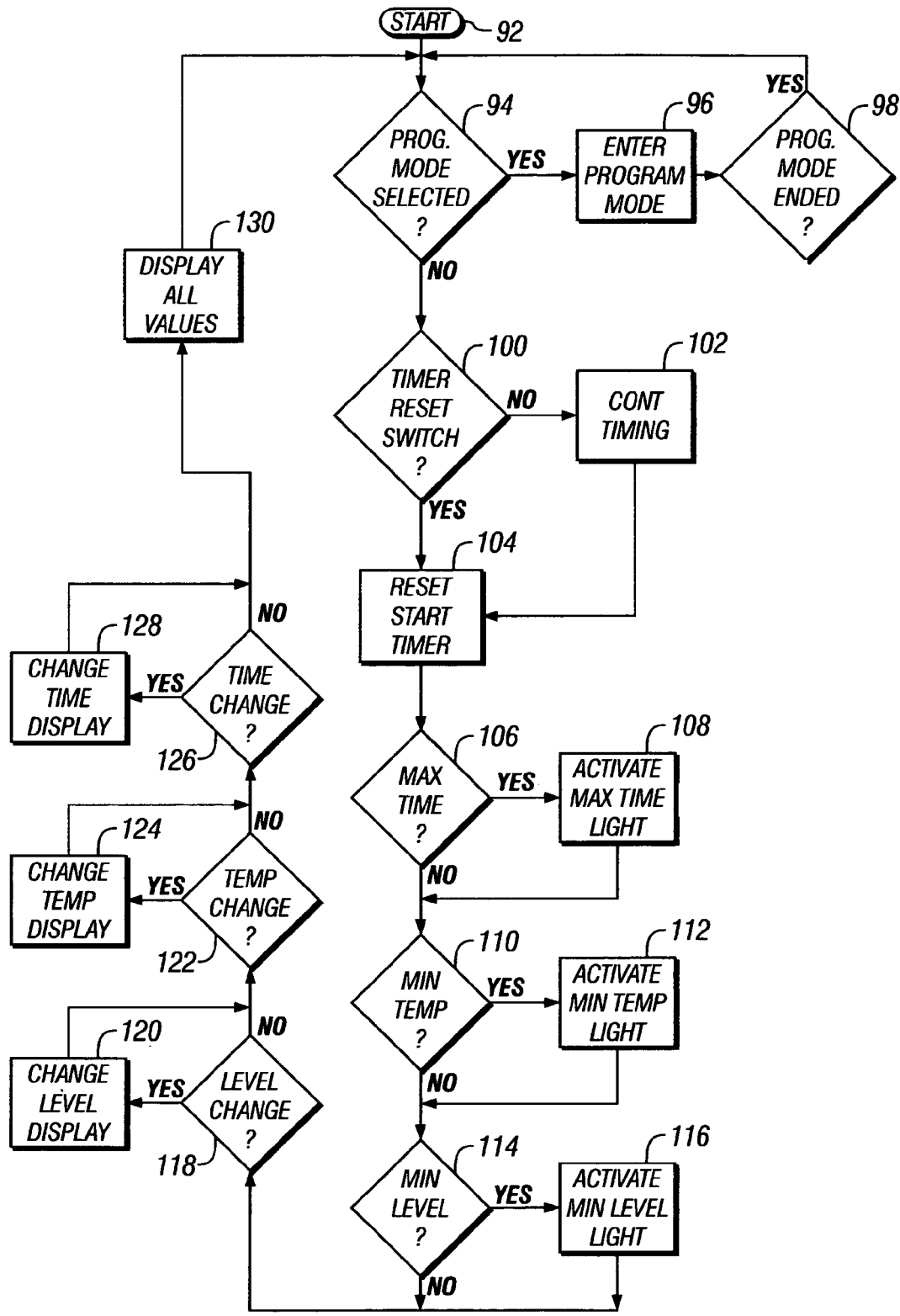
FIG. 7 is a logic flow chart of the software that is used to operate the operation of the display system microcomputer or other circuit for controlling the display in accordance with the senor inputs and manual inputs.

Referring to FIG. 7, after all of the parameters have been entered during programming mode, and the battery 78 is connected with the computer controller 62 the computer controller 62 operates according to this logic flow chart, or algorithm. After start 92, a determination is made in step 94 if the program mode has been selected, such as by sensing that program switch 57 has been kept in an actuated state for more than two seconds, for example. If so, then the program enters the program mode in step 96. In the program mode, a determination of when the program mode is to be exited, either by virtue of an automatic time out if no entries are made or if an exit program option is selected. During the program mode of operation, the display screen is used to prompt the user to make successive selections of various parameters by providing the user with prompts and information needed to navigate through the programming mode and how to make selections. For instance, actuation of the switch 55 may cause the program to digress through the program or menu selection while actuation of the switch may cause the program to progress through the program. After the parameters of maximum and minimum temperatures, the maximum and minimum quantity and the maximum elapsed time have been entered into and stored by the computer controller 62, then in step 98 the user exits the parameters program mode and the program returns to step 94. If no parameter selection is chosen for a preselected time period then the program automatically returns to step 94. If the program mode is not selected, in step 84 the program moves to step 100.

In step 100 a determination is made as to whether the timer-reset switch 46, FIG. 1, has been actuated to start a new elapsed time period when the dispenser is removed from the brewer at the end of the brew cycle. If the timer reset switch has not been actuated, then if the timer has already been started it continues to time in step 102 and the program continues on in the program to step 106 If the dispensing urn is still in contact with the brewer 38 then the timer within the computer controller remains in a reset state awaiting actuation of the timer reset switch 46.

If the timer reset switch 46 is actuated when the dispensing urn 10 is removed from the brewer 38, in step 104 the program resets and restarts the timer and then proceeds to step 106. In step 106, a determination is made as to whether the maximum elapsed time has been reached. If so, then in step 108, the maximum time light, back light 53, is actuated or lit to provide an easily seen indication that the beverage in the dispenser has been stored for the maximum elapsed time, and the program continues to step 110. If the preselected maximum time has not been reached yet, then the program continues to step 110 without first actuating the maximum elapsed time light 59, FIG. 2.

In step 110, a determination is made whether the minimum, preselected temperature has been reached. If the minimum preselected temperature has been reached then in step 112 the minimum temperature back light 55, FIG. 2, is actuated to indicate from a distance that the beverage has dropped below the preselected minimum. The program then continues to step 114. If the minimum temperature has not been reached then the program continue straight to step 114 without actuation of the minimum temperature light.

In step 114, a determination whether the preselected minimum level, or quantity has been reached. If so, then in step 116, the minimum level light is activated to proved a clear indication from a distance. If not, then the program proceeds to step 118 to determine if there has been a change in the level since the last cycle through the program. If so, then in step 120, the graphic and bar graph displays 68 and 70, FIG. 2, are changed accordingly. If not, then the displays remain unchanged and the program proceeds to step 122.

In step 122, it is determined whether the temperature has change sufficiently to change the graphic display 64 and the numerical display 66. If so, then in step 124 the displays are changed to reflect the new temperature that has been sensed by the temperature probe 44. If not, or after the display has been changed, the program proceeds to step 126.

In step 126, a determination is made whether there has been a sufficient change in time to change the graphic time display 72 or the numerical time display 74. If there has been a sufficient time change, such a change of one minute, then in step 128 the time displays are changed accordingly. In step 130, all values of temperature, quantity and time continue to be displayed in step 130 whether there have been changes or not. The program then returns to step 94 and the program loop is repeated.

Figure 8:
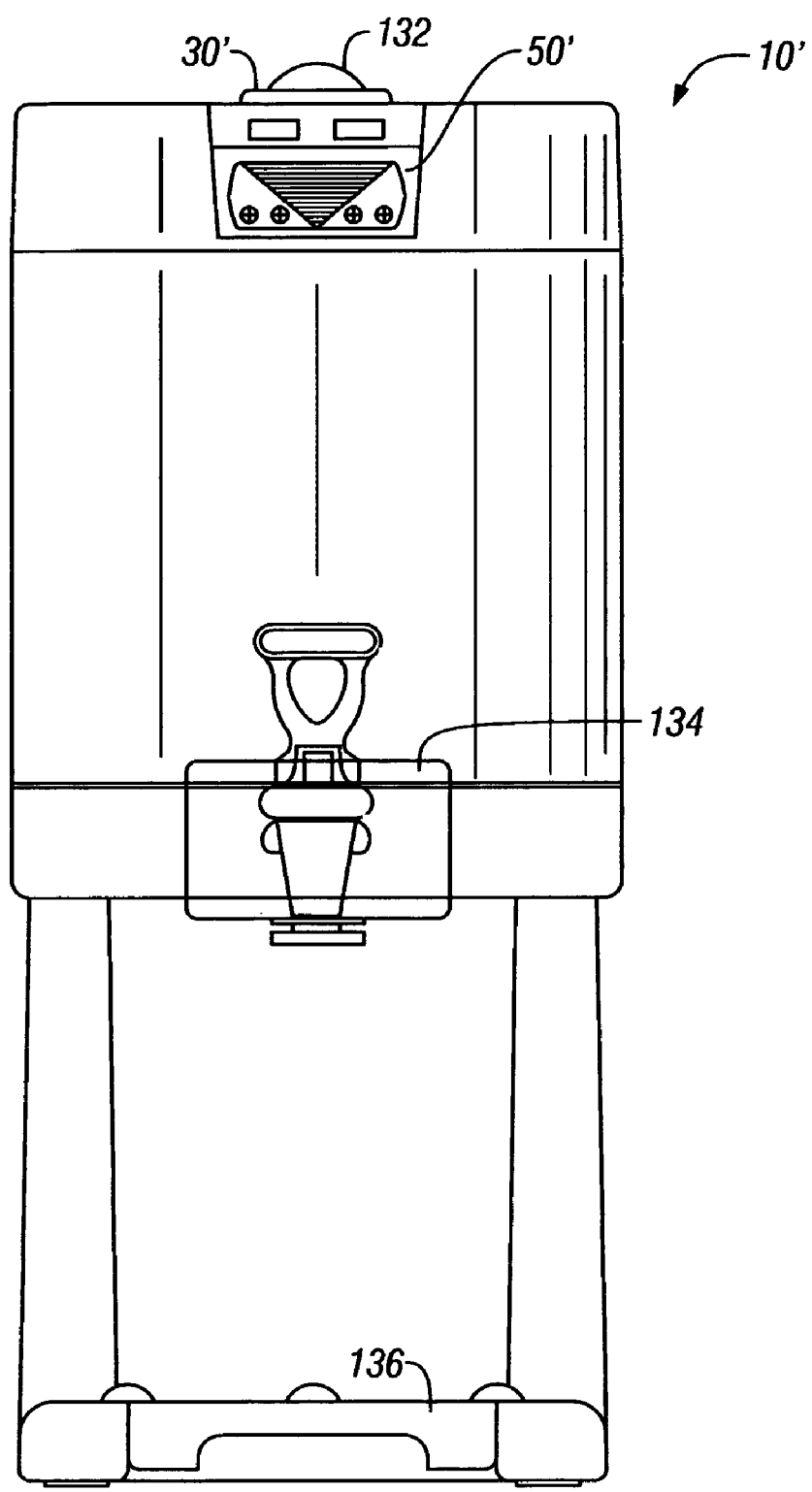
FIG. 8 is a front elevation view of a specific commercial embodiment of the a beverage dispenser incorporating the features of the present invention as generally described above with reference to FIGS. 1-7, but in which the display and all of the electrical components have been integrated into and protectively contained within the removable funnel assembly.

Referring now to FIG. 8, a preferred commercial embodiment 10' of the dispenser of the present invention is shown in which the display 50 has been integrated into the funnel assembly 32 together with the battery power supply 78 and the controller 62 to eliminate the need for interconnecting switches. This combined, or integrated structure also enables sealing all of the electrical elements together within waterproof compartments and to enable removal of the display 50 and electronic elements as a single unit for replacement or repair. The reference numerals used to identify various elements of the beverage dispenser assembly 10 of FIG. 1 are generally used, either with or without a prime, to identify the same or corresponding parts in the commercial dispenser embodiment 10' of FIGS. 8-14 and unless otherwise indicated these parts perform the same function and operate in the same or equivalent ways as described above with reference to FIGS. 1-7. If marked with a prime, the same general function is being performed but there are significant differences relevant to the invention.

Still referring to FIG. 8, the beverage dispenser 10', in addition to the elements already described, has a stopper 132 that is shown in a position closing access to the opening of the funnel to reduce heat loss and to prevent any attempt to refill the beverage dispenser 10' before it has been the use of the beverage dispenser 10'. When the stopper 132 is in the position shown, it blocks sliding movement beneath the brew basket of the coffee maker 38. The beverage dispenser also has a faucet guard 134 and a drip tray 136. These additional parts are of no significance to the present invention except the stopper 132, as will be explained below.

Most importantly, the brewer 10' has a display 50' that is integrated into, and made a part of, the removable funnel assembly 30'. Advantageously, this enables simple manual removal of the display 50' with the funnel assembly 30' for replacement, repair, cleaning and separate shipping in a protective container adapted for protecting the more fragile elements of the beverage dispenser.

Figure 9:
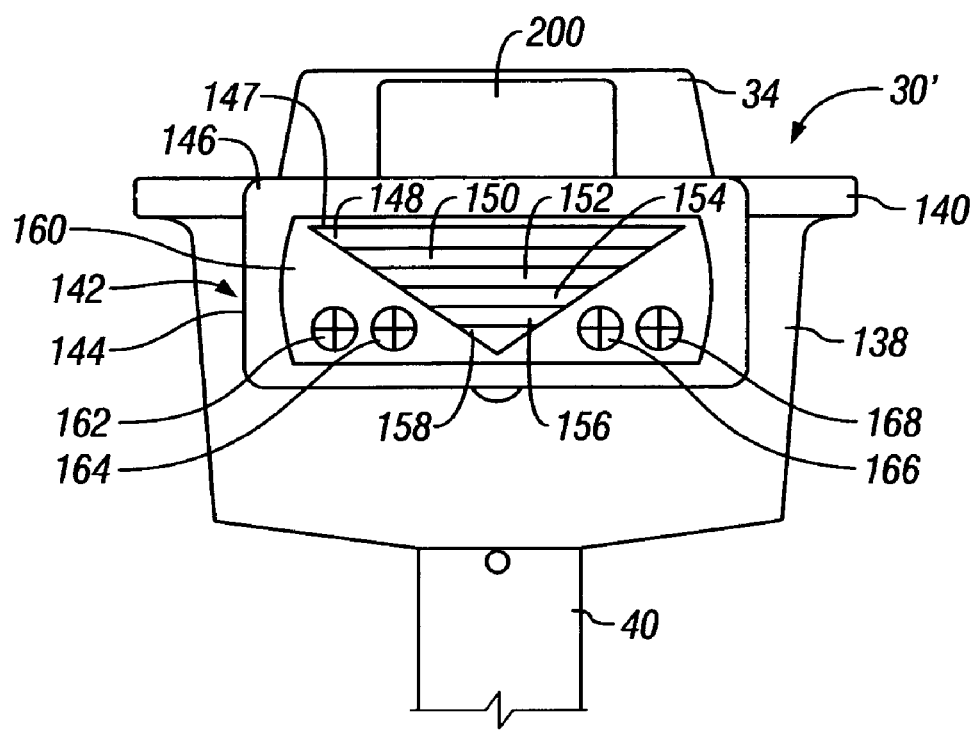
FIG. 9 is an enlarged side elevation view of the integrated funnel assembly of FIG. 8 to more clearly illustrate the display graphics that are used to indicate level and time.
Figure 10:
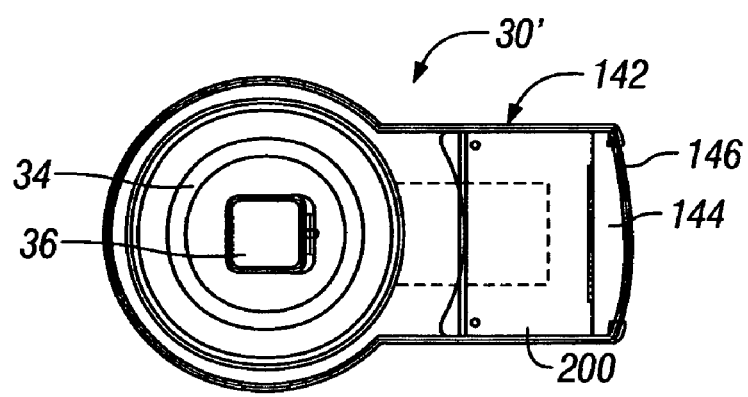
FIG. 10 is a plan view of the integrated funnel assembly of FIGS. 8 and 9.
Figure 11:
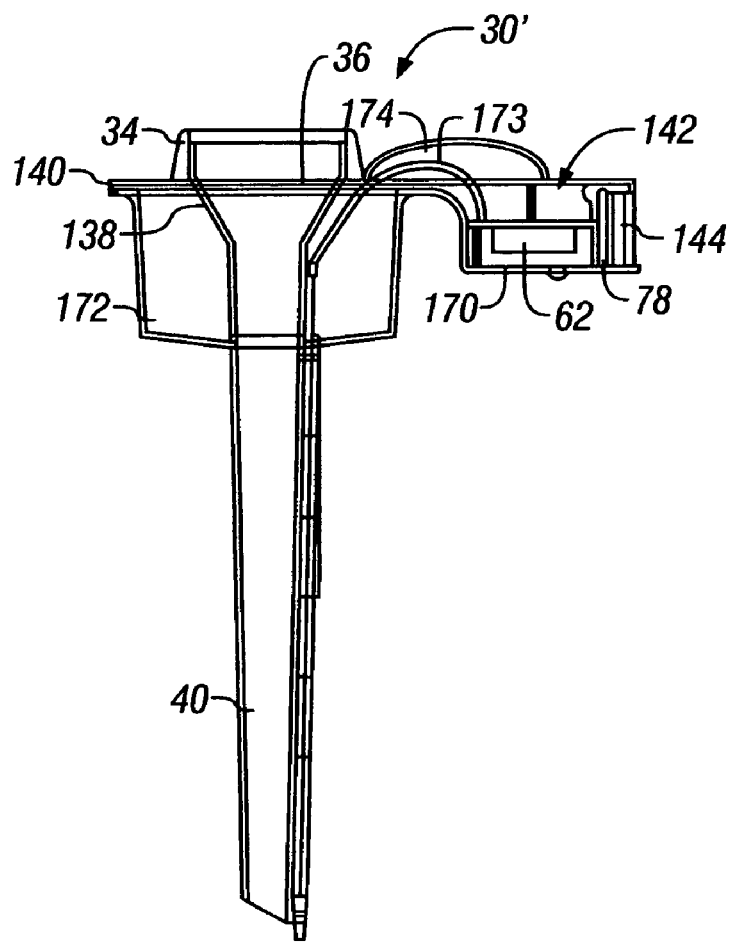
FIG. 11 is a side elevation view of the integrated funnel assembly of FIG. 10.

Referring now to FIG. 9, the integrated funnel assembly 30' is seen to include the collar 34 that extends above the upper surface of the top cover that surrounds the inlet opening 36 to the funnel body 138. The funnel body 138 has a radially extending collar 140 that supports the funnel body 138 within a funnel body receiving opening in the top cover. The bottom of the funnel body drains into the top open end of the feed tube, or down tube, 40 which is an integral part of the integrated funnel assembly 30'. Also, extending from the funnel body 138 is an electronic display module 142 that includes an electronic display screen 144, such as a black and white liquid crystal display or the like, protectively surrounded by a frame 146 that is attached to and comprises an integral part of the display module 140. As seen the display screen 144 preferably displays a triangular graphic display 147 with multiple bars 148, 150, 152, 154, 156 and 158 which are individually representative of successive levels, or quantities of beverage, contained within the body 20 of the dispenser 10'. When all of the bars 148-158 are of a different color than the background 160 of the screen, then a full beverage dispenser is indicated. When none of the bars 148-158 are of contrasting color then an empty beverage dispenser is indicated. For quantities of beverage between empty and full, different numbers of the bars 148-158 are shown in contrasting color, such as black against white. Color displays could of course also be used in which case red and green may be used for instance.

The level of each of the bars may represent a corresponding level of beverage 14 in the liner 12 such that the bars are directly related with each bar representing a different successive level. The difference between adjacent levels is approximately equal except the lowest and second lowest levels. Alternatively, the relative area of the bars 148-158 is representative of a corresponding quantity of beverage such that each successively lower bar represents a lower incremental quantity of beverage contained within the liner 12, regardless of the level, such that the resolution of quantity becomes greater as the quantity of beverage remaining grows less. This alternative can be a user or service programmable parameter.

In addition to the triangular display 147, the display screen also displays a graphic representation of four quartered circles 162, 164, 166 and 168 with each one of the circles circle representing a different one of four successive hours since the beverage dispenser 10' has been filled. Each quarter section of each of the circles represents a quarter of the hour of the circle of which it is a part. If all four circles are shown with a color or shade that contrasts with the background color or shade, then this indicates that it has been four or more hours since the beverage dispenser 10' has been filled. If two entire circles are of contrasting color and two quarters of another one of the circles are of a contrasting color then this indicates that two and one half hours have passed since the beverage dispenser has been filled with freshly brewed coffee or other beverage, etc.

Figure 12:
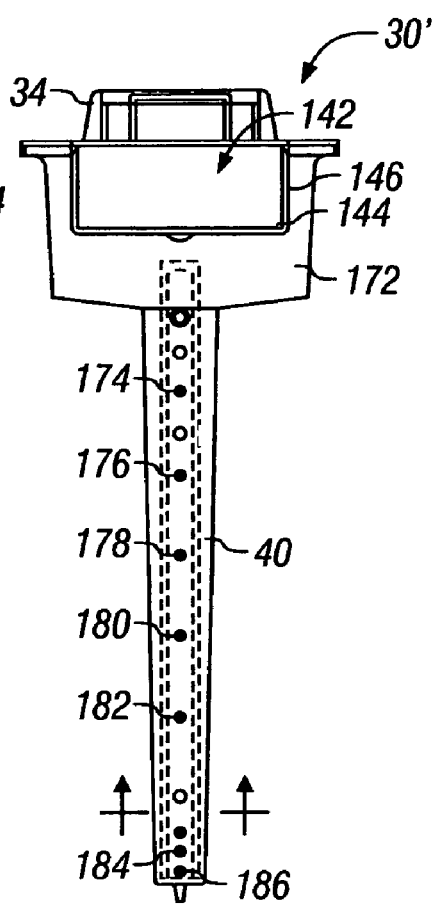
FIG. 12 is a front elevation view of the integrated funnel assembly of FIGS. 10-11.

The computer 62 instead of responding to the timer reset switch the is programmed to respond to the level sensors 42, i.e. the level probes 174-184 described below with reference to FIG. 12, below, to reset the timer contained within the computer 62. When the computer receives signal from the level sensor 42 that the level is rising above the uppermost probe 174 after having contacted the next lowest probe 176, indicating that the dispenser has been newly filled, the computer resets the timer to zero and starts the timer. The elapsed time is then displayed as described in response to the elapsed time measured by the timer.

Referring now to FIGS. 10-13, the electronic display module 142 is seen to include an electronics housing 170 that carries the screen 144 and screen frame member 146 at a distal end. Protectively located within the electronics housing 170 is the microcomputer 62, the battery power supply 78, and all interconnections and interfaces with the level sensor 42 and the temperature sensor 44. The funnel body 138 is enclosed by an insulating annular funnel housing 172, and an enclosed passageway 174 extending between the top of the housing 170 and the top of the funnel housing 172 protectively encloses an electrical cable 173 that connects the microcomputer 62 with a plurality of incremental level sensing probes 174, 176, 178, 180, 182 and 184 corresponding to the bar graph display bars 148-158, and a common probe 186, FIG. 9. The lowest probe is the common probe 186 that remains in contact with the beverage even when it is beneath probe 184. A separate wire is used to connect each of the level sensing probes and the common probe 186 with the computer 62.

The computer detects a change of resistance between the common probe 186 and any of the other probes 174-184 when any one of the other probes make or breaks contact with the beverage. When probe 184 is contacted but before probe 182 is contacted, the lowest bar 158 of the display is actuated. When probe 180 is makes contact with the beverage, then bar 156 is also actuated and so on until probe 174 is contacted and the top bar 148 and all the other bars are actuated to indicate the dispenser is full. The top bar 156 remains actuated until the level of the beverage drops beneath the highest probe 174 beverage and the other bars likewise remain actuated until the level drops beneath their associated probe.

Figure 13:
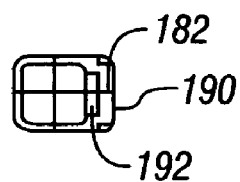
FIG. 13 is a sectional view of the end of the down tube taken along the section line of the funnel assembly of FIG. 12.

As seen in FIG. 13; the probes 174-184 are mounted to an elongate mounting member 182 that extends along the length of the down tube 40 and which provides a channel 192 for wire connections that is isolated from the interior of the down tube and the beverage. The probes are in contact with an outside surface of the mounting member 190 but are sealed to prevent entry of beverage into the channel 192. Thus, it is seen that the integrated funnel assembly 30' with the electronics module and probe carrying down tube all sharing a single housing sealed against water eliminates the need for switches and electrical connectors required when not all the components are part of a single subassembly or module.

Figure 14:
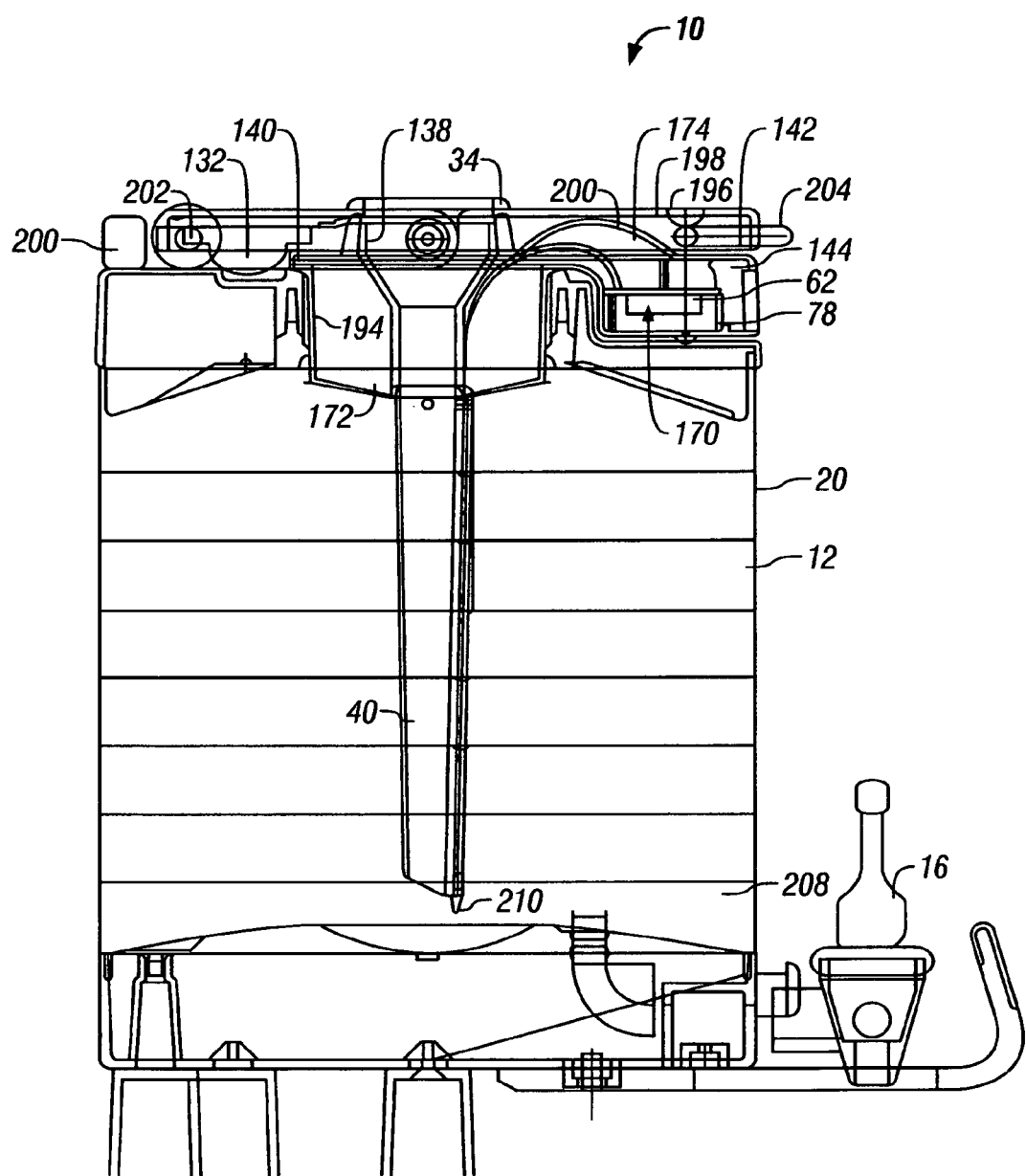
FIG. 14 is a partly sectional side view of the beverage dispenser of FIG. 8 showing the position of the integrated funnel assembly in position within the liner body 12 beneath a pivotally mounted cover with the stopper in position to enable receipt of fresh beverage.

Referring to FIG. 14, the integrated funnel assembly 30' is seen as mounted within the top inlet opening 194 with sealing grommets in sealing engagement with the outside of the funnel housing 172. A closure cover 196 has a center opening with a collar 34 and presses down on the top of the shoulder 194 at the top of the funnel housing 172. A concavity 198 within the cover 196 accommodates receipt of the upwardly extending portion 200 of the integrated funnel assembly 30' that defines the passageway 174 for the cable 173 and presses down on it to also keep it in place when closed. The closure cover 136 is pivotally mounted by means of pivot axes and is latched close by a suitable spring-loaded latch with a pair of pinch members 204 that may be manually squeezed together to release the latch. In order to remove the funnel assembly 30', a handle 206 is lifted above the position shown to enable the cover to pivot, the latch is released, the cover 196 is pivoted upwardly to release the downward hold on the funnel assembly 30' and axle stubs 202 may be slid out of backwardly facing axle slots within which the axle stubs 202 are located. The down tube 40 extends all the way to the bottom 210 of the liner 12 and has a distal end connector 210 received within a mating receptacle within the bottom 210 to secure the distal end of the down tube 40 against lateral movement when fully installed. For further details concerning the closure cover and the other cover components and the seating of the funnel assembly beneath the closure cover 136 reference should be made to U.S. Pat. No. 6,708,598 issued Mar. 23, 2004 and entitled "Beverage Dispenser with Cover Assembly and Method", which is hereby incorporated by reference.

While the details of a particular embodiments have been shown, and implementation of the invention has been described above in a particular way, it should be appreciated that many variations may be made without departing from the concepts and scope of the invention as defined in the appended claims. For instance, the quantity can be expressed in units other that cups. The timer can be either an elapsed time timer or it can be a count-down timer to indicate how much time remains of the preselected time duration. Not all of the displays have to be provided to obtain the benefits derived from use of the other displays. In fact, the embodiment of FIGS. 8-14 has no display for temperature and no means for programming different high/low temperature settings or other parameters, as in the embodiment of FIG. 1, it still displays time and level. Other equivalents and obvious variations will be apparent to persons of ordinary skill in the art.

The invention claimed is:

1. In a portable beverage dispenser having an opaque, insulated, non-electrically heated, hollow body with a closed bottom, atop with an inlet for receipt of a beverage for containing a multiple servings of the beverage and means for selectively dispensing servings of the consumable liquid from within the body, the improvement being an electronic level display assembly, comprising:
   an electronic liquid level sensor assembly mounted to the hollow body and in sensing relationship with the consumable liquid within the hollow body to sense a plurality of different liquid levels;
   an electronic display mounted to the hollow body and facing laterally outwardly from the hollow body for ease of viewing from a lateral position spaced from the side hollow body;
   a controller responsive to the electronic liquid level sensor for controlling the electronic display to show an indication of the plurality of different liquid levels in response to the electronic liquid level sensor assembly; and
   a portable power supply carried by the hollow body for providing a source of operating energy for both the electronic liquid level sensor assembly and the electronic display, said portable power source being the only source of electrical power of the portable dispensing urn assembly.

2. The portable beverage dispenser of claim 1 including a sensor mounting member that is mounted to the hollow body and carries the electronic liquid level sensor assembly within the interior of the hollow body.

3. The portable beverage dispenser of claim 2 in which the sensor mounting member assembly is releasably mounted to the hollow body.

4. The portable beverage dispenser of claim 2 in which the sensor mounting member is elongate and is mounted to extend from adjacent the top to adjacent the bottom within the hollow body and the electronic level sensor assembly includes a plurality of level sensors arranged along the sensor mounting member at a plurality of different distances from the bottom corresponding to the plurality of different liquid levels, respectively.

5. The portable beverage dispenser of claim 2 in which the sensor mounting member carries the electronic display outside of the hollow body.

6. The portable beverage dispenser of claim 2 in which the mounting member has a water-tight compartment within which the controller is protectively mounted.

7. The portable beverage dispenser of claim 2 in which the mounting member has a water-tight compartment within which the controller is protectively mounted.

8. The portable beverage dispenser of claim 2 in which the mounting member has a water-tight compartment within which the portable power supply is protectively mounted.

9. The portable beverage dispenser of claim 1 including a mounting assembly attached to the hollow body with at least one water-tight compartment for protectively enclosing the controller, the portable power supply, electrical connections between the electronic liquid level sensor and the controller, electrical connection between the controller and the display and electrical connection between the portable power supply and the electronic liquid level sensor assembly, the electronic display and the controller.

10. The portable beverage dispenser of claim 1 including a single integrated mounting assembly for protectively housing all the electronic liquid level sensor assembly, the electronic display, the controller and the portable power supply, and means for releasably attaching the mounting assembly to the hollow body.

11. The portable beverage dispenser of claim 10 in which the mounting assembly has a tubular portion for carrying the electronic sensor that extends downwardly within a central portion of the hollow body from adjacent the top to adjacent the bottom.

12. The portable beverage dispenser of claim 1 in which the sensor assembly is releasably attached to and carried by the hollow body within the interior surface of the hollow body.

13. The portable beverage dispenser of claim 1 including
   an electronic temperature sensor separate and apart from the electronic liquid level sensor for sensing actual declining temperature of the beverage, itself, within the hollow body, and in which
   the controller is responsive to the to the electronic temperature sensor to control the electronic display to show the actual temperature of the beverage.

14. The portable beverage dispenser of claim 1 in which the electronic liquid level sensor is capable of tool-less manually removal from the hollow body to enable cleaning of the interior surface.

15. The portable beverage dispenser of claim 1 including a funnel assembly releasably attached to the hollow body and extending through the inlet and within the hollow body, said funnel assembly carrying the electronic liquid level sensor, the electronic display, the controller and the portable power supply.

16. The portable beverage dispenser of claim 1 in which the portable power supply is a battery.

17. The portable beverage dispenser of claim 1 in which the portable power supply is a long life battery.

18. The beverage dispenser of claim 1 in which the plurality of levels include at least three equally spaced levels between adjacent the top and adjacent the bottom of the hollow body.

19. The beverage dispenser of claim 1 in which the electronic display shows the plurality of levels with one of (a) a graphic representation, and (b) a numerical representation.

20. The beverage dispenser of claim 1 in which the controller controls the electronic display to show an indication of the quantity of beverage remaining in the hollow body based on the level of the beverage sensed by the electronic level sensor assembly.

21. The portable beverage dispenser of claim 1
   including means for sensing temperature of the beverage that is solely dedicated to providing information needed for display of the actual decreasing temperature of the beverage contained within the unheated, hollow body, and in which the electronic liquid level sensor is solely dedicated to providing information needed fig display of actual different quantities of beverage contained within the hollow body, and in which
   the display means includes means to display both the actual decreasing temperature of the beverage and the actual different quantities of beverage contained within the opaque, unheated hollow body.

22. The dispensing urn of claim 1 including
   a timer carried by the hollow body, and
   means carried at least in part by the hollow body fig restarting the timer each time beverage is added to the hollow body.

23. The portable beverage dispenser of claim 22 in which the restarting means includes means for restarting the timer by manual actuation of a restart switch.

24. The beverage dispenser of claim 22 in which the display means includes means for displaying the elapsed time of the timer since being reset.

25. The portable beverage dispenser of claim 22 in which the electronic display includes means includes at least one of (a) a graphic display, (b) a numeric display, or (c) an indicator light.

26. The portable beverage dispenser of claim 1 including a temperature sensor for sensing the temperature relatively adjacent the bottom of the urn body that is dedicated solely to providing temperature information needed for displaying the actual temperature of the beverage contained within the unheated hollow body.

27. The portable beverage dispenser of claim 1 in which the controller includes a micro-computer.

28. In a portable beverage dispenser having an opaque, insulated, non-electrically heated, hollow body with a closed bottom, atop with an inlet for receipt of a beverage for containing a multiple servings of beverage and means for selectively dispensing servings of the consumable liquid from within the body, the improvement being an electronic level display assembly, comprising:
an electronic liquid level sensor assembly mounted to the hollow body and in sensing relationship with the consumable liquid within the hollow body to sense a plurality of different liquid levels;
an electronic display mounted to the hollow body and facing laterally outwardly from the hollow body for ease of viewing from a lateral position spaced from the side hollow body;
a controller responsive to the electronic liquid level sensor for controlling the electronic display to show an indication of the plurality of different liquid levels in response to the electronic liquid level sensor assembly, said plurality of different liquid levels being expressed in terms of a number of servings of beverage remaining of preselected serving size; and
a portable power supply carried by the hollow body for providing a source of operating energy for both the electronic liquid level sensor assembly and the electronic display, said portable power source being the only source of electrical power of the portable dispensing urn assembly.

29. In a portable dispensing urn assembly having an insulated, unheated, opaque, hollow body with an interior surface for containing beverage and extending between a top with an inlet for receiving beverage and a bottom, and a manually operable beverage dispenser attached to an exterior surface of the body for selectively dispensing beverage from the hollow body, the improvement being a method of indicating a condition of the beverage contained within the unheated, opaque hollow body, comprising the steps of:
electronically directly sensing an actual condition of the beverage within the hollow body to be displayed with electronic sensing means attached to and carried by the hollow body; and
displaying with a display means attached to and carried by the hollow body the indication of the actual beverage condition of the beverage contained within the hollow body in response to the electronic actual condition directly sensing means.

30. The method of claim 29 in which the step of sensing includes at least one of the steps of (a) sensing level of the beverage within the hollow body with an electronic sensor contained within the hollow body for, and (b) sensing temperature of the beverage within the hollow body with another electronic sensor.

31. The method 29 including the step of tool-less manually removal of the sensor from the hollow body to enable cleaning of the interior surface.

32. The method of claim 29 including the step of carrying the means for actuating the display within the interior surface of the hollow body for movement with the hollow body between locations.

33. The method of claim 29 including the step of carrying the sensing means with the hollow body and within the interior surface of the body when the hollow body is moved between locations.

34. The method of claim 29 including the steps of carrying a battery power supply with the hollow body to provide portable power to a display for performing the step of displaying and to a sensing means for performing the step of sensing when the hollow body is moved between locations.

35. The method of claim 29 in which the step of displaying includes the step of displaying an actual beverage condition including at least one of (a) an indication of different quantities corresponding to different quantities of beverage contained within the opaque hollow body and sensed by a quantity sensor, and (b) temperature of the beverage contained within the body.

36. The method of claim 29 in which the step of electronically sensing an actual condition of the beverage includes at least one of the steps of (a) sensing the a plurality of decreasing actual levels of the beverage contained within the hollow body between a level associated with the hollow body being filled with beverage and a level associated with the hollow body being nearly empty of beverage, and (b) sensing the temperature of the beverage in the unheated hollow body as the temperature of the actual beverage declines.

37. The method of claim 29 in which the step of displaying includes the step of displaying all of the beverage conditions (a), (b) and (c) on a single display unit.

38. The method of claim 29 in which the condition is displayed by means of at least one of (a) a graphic display, and (b) a numerical display.

39. The method of claim 29 in which
the step of sensing includes the step of sensing the a plurality of different quantities of beverage within the interior surface of the hollow body, and
the step of displaying includes the step of displaying a plurality of different quantities of beverage actually contained within the hollow body in response to sensing of the different quantities.

40. The method of claim 29 including the steps of
passing freshly brewed beverage directly through the inlet with a brewer to which the beverage dispenser is especially fitted for direct receipt of freshly brewed beverage;
removing the dispensing urn assembly from the brewer to which it is especially fitted to a remote serving location;
maintaining temperature of the beverage at the remote location solely by means that does not require an electrical AC connection.

41. The method of claim 40 in which the step of maintaining the temperature is performed solely by thermally insulating the hollow body at the remote serving location.

42. The method of claim 41 including the step of serving at the remote serving location by manual operation of a faucet at least a gallon of beverage from the hollow body.

43. The method of claim 40 in which the step of displaying includes the step of displaying the condition of the beverage at the remote serving location.

44. The method of claim 29 including the step of releasably attaching the sensing means to the hollow body and to be carried by the hollow body and within the interior surface of the body when the hollow body is moved between locations.

45. The method of claim 44 including the step of removing the sensing means from within the interior surface of the hollow body through the inlet to clean the interior surface.

46. In a portable dispensing urn assembly having an insulated, unheated, opaque, hollow body with an interior surface for containing beverage and extending between a top with an inlet for receiving beverage and a bottom, and a manually operable beverage dispenser attached to an exterior surface of the body for selectively dispensing beverage from the hollow body, the improvement being a method of indicating a condition of the beverage contained within the unheated, opaque hollow body, comprising the steps of:
  inserting a funnel assembly through the inlet and within the interior surface to be carried by the hollow body, said funnel assembly currying a battery power supply and an electronic actual condition sensing means;
  electronically directly sensing an actual condition or the beverage within the hollow body to be displayed with the electronic actual condition sensing means; and
  displaying with a display means attached to and carried by the hollow body an indication of the actual beverage condition or the beverage contained within the hollow body in response to the electronic actual condition sensing means.

47. In a portable beverage dispenser having a hollow body with an interior surface for containing beverage and extending between a top and a bottom, and a dispensing means attached to an exterior surface of the body adjacent the bottom for selectively dispensing beverage from the hollow body, the improvement being a method of electronically indicating status, comprising the steps of:
  releasably mounting to the top of the hollow body
    a beverage funnel assembly with a funnel body for passage of fresh beverage between a funnel inlet and a funnel outlet, and
    a hollow down-tube extending downwardly into the hollow body of the dispensing urn assembly from the funnel outlet;
  carrying into the hollow body with the down-tube an electronic beverage condition sensor mounted to the down-tube when the beverage funnel assembly is releasably attached to the top of the hollow body;
  passing fresh beverage through the funnel assembly and the down-tube into the hollow body;
  sensing with the electronic beverage condition sensor an actual condition of the beverage contained within the hollow body;
  protecting a display controller within a water tight component housing of the funnel assembly;
  passing electrical signals through an electrical lead extending from the electronic beverage condition sensor to the controller via a relatively rigid, hollow, water tight passageway extending along the down-tube and through the funnel body between the sensor and the electronic component housing; and
  controlling a display mounted to the funnel assembly of the funnel assembly with a controller contained within the water tight electronic component housing of the funnel assembly in response to electrical signals from the electronic beverage sensor to display the actual beverage condition.

48. The method of claim 47 in which the beverage condition sensor includes
  an elapsed-time timer carried by the hollow body, and including the step of
  restarting the timer each time beverage is added to the hollow body by means carried at least in part by the hollow body.

49. A portable, insulated, dispensing urn assembly for temporarily storing and dispensing pre-prepared hot beverage, comprising:
  an insulated, non-electrically heated, opaque, hollow body for holding the pre-prepared beverage with
    an interior for containing hot beverage,
    a top insulated cover with a releasably attached funnel assembly with an inlet for receiving beverage directly from a beverage brewer and
    an outlet for passing the received beverage to the interior, and
    an insulated bottom;
  a manually operable dispenser attached to an exterior surface of the body;
  an electronic beverage condition sensor carried by the hollow body for electronically, directly sensing the a plurality of different quantities of a beverage within the interior;
  an electronic display carried by the hollow body that is connected to the sensor means attached to the hollow body for displaying an indication of the different quantities of the actual beverage condition in response to the electronic, actual beverage condition directly sensing means; and
  a portable power supply carried by the hollow body for providing a source of electrical energy for both the electronic sensor and the electronic display, said portable power source being the only source of electrical power of the portable dispensing urn assembly.

50. In a portable beverage dispenser having an opaque, insulated, non-electrically heated, hollow body with a closed bottom, a top with an inlet for receipt of a beverage for containing a multiple servings of the beverage and means for selectively dispensing servings of the consumable liquid from within the body, a method of displaying the amount of beverage within the hollow body, comprising the steps of:
  mounting an electronic liquid level sensor assembly to the hollow body and in sensing relationship with the consumable liquid within the hollow body to sense a plurality of different liquid levels; and
  showing an indication of a plurality of different quantities of liquid in response to the liquid level sensor assembly with a electronic display mounted to the hollow body and facing laterally outwardly from the hollow body for ease of viewing from a lateral position spaced from the side; and
  powering with a portable power supply carried by the hollow body a source of operating energy for both the electronic liquid level sensor assembly and the electronic display, said portable power source being the only source of electrical power of the portable dispensing urn assembly.

51. The method of claim 50 including the step of carrying the electronic sensor assembly within the interior of the hollow body on a mounting member attached to the hollow body.

52. The method of claim 51 in which
  the sensor mounting member is elongate and is mounted to extend from adjacent the top to adjacent the bottom within the hollow body, and
  the electronic level sensor assembly includes a plurality of level sensors arranged along the sensor mounting member at a plurality of different distances from the bottom corresponding to the plurality of different liquid levels, respectively.

53. The method of claim 51 including the step of carrying the electronic display outside of the hollow body on the sensor mounting member.

54. The method of claim 51 in which the mounting member has a water-tight compartment within which the controller is protectively mounted.

55. The method of claim 51 including the step of protectively mounting the microcomputer within a water-tight compartment of the mounting member.

56. The method of claim 51 including the step of protectively mounting the portable power supply within a water-tight compartment of the sensor mounting member.

57. The method of claim 50 including a mounting assembly attached to the hollow body with at least one water-tight compartment and including the step of protectively enclosing within the at least one water-tight compartment the controller, the portable power supply, electrical connections between the electronic liquid level sensor and the controller, electrical connection between controller and the display and electrical connection between the portable power supply and the electronic liquid level sensor assembly, the electronic display and the controller.

58. The method of claim 50 including a single integrated mounting assembly and including the step of protectively housing all the electronic liquid level sensor assembly, the electronic display, the controller and the portable power supply, and means for releasably attaching the mounting assembly to the hollow body.

59. The method of claim 58 in which the mounting assembly has a tubular portion that extends downwardly within a central portion of the hollow body from adjacent the top to adjacent the bottom and the step of sensing includes the step of carrying the sensor assembly into the interior of the hollow body on the tubular portion.

60. The method of claim 59 in which the tubular portion is attached to a funnel mounted to the inlet and including the step of guiding beverage received in the funnel to adjacent the bottom of the hollow body.

61. The method of claim 50 including the step of
sensing actual declining temperature of the beverage, itself, within the hollow body with an electronic temperature sensor separate and apart from the electronic liquid level sensor, and
responding to the to the electronic temperature sensor to control said electronic display to show the actual temperature of the beverage.

62. The method of claim 50 including the step of manually removing the electronic sensor from the hollow body to enable cleaning of the interior surface.

63. The method of claim 50 in which the portable power supply is a battery.

64. The method of 50 in which the plurality of levels are equally spaced between adjacent the top and adjacent the bottom of the hollow body.

65. The method of claim 50 in which the electronic display shows the plurality of levels with one of (a) a graphic representation, and (b) a numerical representation.

66. The method of claim 50 including the step of controlling the electronic display to show an indication of the quantity of beverage remaining in the hollow body based on the level of the beverage sensed by the electronic level sensor assembly.

67. The method of claim 50 including the step of
sensing temperature of the actual temperature of the beverage with an electronic temperature sensor that is solely dedicated to providing information needed for display of the actual decreasing temperature of the beverage contained within the unheated, hollow body, and in which
the step of sensing a plurality of different levels is performed with sensors that are solely dedicated to providing information needed for display of actual different quantities of beverage contained within the hollow body, and
the step of displaying includes the step of displaying both the actual decreasing temperature of the beverage and the actual different quantities of beverage contained within the opaque, unheated hollow body.

68. The method of claim 50 including the steps of
carrying a timer by the hollow body, and
restarting the timer each time beverage is added to the hollow body.

69. The method of claim 68 in which the step of restarting is performed by (a) manually actuating a restart switch or (b) automatically restarting the timer in response to direct sensing or the addition of beverage to the hollow body.

70. The method of claim 68 in which the step of displaying includes the step of displaying the elapsed time of the timer since being reset.

71. The method of claim 68 in which the electronic display includes means includes at least one of (a) a graphic display, (h) a numeric display, or (c) an indicator light.

72. The method of claim 50 including the step of sensing the temperature relatively adjacent the bottom of the urn body with a temperature sensor that is dedicated solely to providing temperature information needed for displaying the actual temperature of the beverage contained within the unheated hollow body.

73. The method of claim 50 in which the controller includes a micro-computer.

74. In a portable beverage dispenser having an opaque, insulated, non-electrically heated, hollow body with a closed bottom, atop with an inlet for receipt of a beverage for containing a multiple servings of the beverage and means for selectively dispensing servings of the consumable liquid from within the body, a method of displaying the amount of beverage within the hollow body, comprising the steps of:
mounting an electronic liquid level sensor assembly to the hollow body and in sensing relationship with the consumable liquid within the hollow body to sense a plurality of different liquid levels;
showing an indication of a plurality of different quantities of liquid in response to the liquid level sensor assembly with a electronic display mounted to the hollow body and facing laterally outwardly from the hollow body for ease or viewing from a lateral position spaced from the side; and
powering with a portable power supply carried by the hollow body a source of operating energy for both the electronic liquid level sensor assembly and the electronic display, said portable power source being the only source of electrical power of the portable dispensing urn assembly; and
controlling the electronic display to show an indication of the quantity of beverage remaining in the hollow body based on the level or the beverage sensed by the electronic level sensor assembly, the quantity of beverage being expressed in terms of a number of servings of beverage remaining of pre-selected serving size.

75. In a portable beverage dispenser having an hollow insulated body, the improvement being a self-contained beverage display assembly, comprising:
an electronic display;

an electronic level sensor for sensing a plurality of different beverage levels; and an electronic controller responsive to the electronic level sensor to control the electronic display to provide an indication of one of a plurality of beverage levels; and a housing mounted to the hollow insulated body and protectively enclosing the level sensor and the electronic controller and supporting the display.

76. The portable beverage dispenser of claim 75 including a portable power supply for providing electrical power to the display, the sensor and the controller and in which the housing protectively encloses the portable power supply.

77. The portable beverage dispenser of claim 76 in which the portable power supply is a battery.

78. The portable beverage dispenser of claim 75 in which the electronic level sensor is connected to the controller via hard-wire connection and the housing includes a water-tight compartment for protectively enclosing the hard-wire connection.

79. The portable beverage dispenser of claim 75 in which the electronic controller is connected to the display via a hard-wire connection and the housing includes a water-tight compartment for protectively enclosing the hard-Wire connection.

80. The portable beverage dispenser of claim 75 in which the hollow insulated body has an open top with a substantial access opening to enable manually cleaning within the hollow insulated body and the housing is mounted to substantially cover the opening except for a relatively small inlet opening carried by the housing.

81. The portable beverage dispenser of claim 75 in which the electronic level sensor includes a plurality of sensors for sensing the plurality of different levels, respectively.

82. The portable beverage dispenser of claim 75 in which the electronic level sensor directly senses the level of the beverage and the housing includes means for releasably suspending the level sensor in the beverage within the hollow body.

83. The portable beverage dispenser of claim 75 in which the electronic display is a liquid crystal display with a display screen and a frame protectively surrounding the display screen.

84. In a portable beverage dispenser having an hollow insulated body, the improvement being a self-contained beverage display assembly, comprising:

an electronic display;

an electronic level sensor for sensing a plurality of different beverage levels; and an electronic controller responsive to the electronic level sensor to control the electronic display to provide an indication of one of a plurality of beverage levels;

a housing mounted to the hollow insulated body and protectively enclosing the level sensor and the electronic controller and supporting the display;

a top cover mounted to the top of the hollow body; and in which the housing includes a funnel body with a radially extending collar that supports the funnel body within a funnel body receiving opening in the top cover.

* * * * *